(12) United States Patent
Park

(10) Patent No.: US 7,529,412 B2
(45) Date of Patent: May 5, 2009

(54) IMAGE PROCESSING APPARATUS AND METHOD FOR CONVERTING IMAGE DATA BETWEEN RASTER SCAN ORDER AND BLOCK SCAN ORDER

(75) Inventor: Hyun-Sang Park, ChonAn-shi (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 695 days.

(21) Appl. No.: 10/699,922

(22) Filed: Nov. 4, 2003

(65) Prior Publication Data

US 2004/0096108 A1 May 20, 2004

(30) Foreign Application Priority Data

Nov. 7, 2002 (KR) .................... 10-2002-0068871

(51) Int. Cl.
*G06K 9/36* (2006.01)
*G06K 9/54* (2006.01)
*G06K 9/60* (2006.01)

(52) U.S. Cl. ................... 382/232; 382/276; 382/305

(58) Field of Classification Search ............ 382/232, 382/276, 305

See application file for complete search history.

(56) References Cited

U.S. PATENT DOCUMENTS

| 5,819,035 | A | * | 10/1998 | Devaney et al. | ............. 709/202 |
| 5,973,707 | A | * | 10/1999 | Mita | ............. 345/574 |
| 5,982,396 | A | * | 11/1999 | Kim | ............. 345/572 |
| 6,115,138 | A | * | 9/2000 | Yanaka | ............. 358/1.9 |
| 6,212,300 | B1 | * | 4/2001 | Rengakuji | ............. 382/232 |
| 2004/0013316 | A1 | * | 1/2004 | Park et al. | ............. 382/276 |

FOREIGN PATENT DOCUMENTS

| JP | 05-252398 | | 9/1993 |
| JP | 08-153188 | | 6/1996 |
| JP | 08-171384 | A | 7/1996 |
| JP | 08-195954 | | 7/1996 |
| JP | 10-341456 | | 12/1998 |
| JP | 2004159330 | A * | 6/2004 |
| KR | 1998-43709 | A | 9/1998 |

* cited by examiner

Primary Examiner—Jingge Wu
Assistant Examiner—Bernard Krasnic
(74) Attorney, Agent, or Firm—Harness, Dickey & Pierce

(57) ABSTRACT

In an image processing apparatus and method for converting a raster format into a block format, generated image data is separated into given color components so as to be stored in a single line memory. A block unit reading may be performed in a sequence adapted to be read in the block format such that the read image data is transmitted to an encoder. Since only one line memory is used, the size of the memory, and hence a chip size containing the memory, may be reduced.

47 Claims, 10 Drawing Sheets

Fig. 7B

| Write for Phase 1 | | | | | | | | | |
|---|---|---|---|---|---|---|---|---|---|
| Anchor Address → | 0 | 1 | 2 | 3 | 4 | 5 | 6 | 7 | 8 | 9 |
| Segment → | S0 | S1 | S2 | S3 | S4 | S5 | S6 | S7 | S8 | S9 |
| | 10 | 11 | 12 | 13 | 14 | 15 | 16 | 17 | 18 | 19 |
| | S10 | S11 | S12 | S13 | S14 | S15 | S16 | S17 | S18 | S19 |
| | 20 | 21 | 22 | 23 | 24 | 25 | 26 | 27 | 28 | 29 |
| | S20 | S21 | S22 | S23 | S24 | S25 | S26 | S27 | S28 | S29 |
| | 30 | 31 | 32 | 33 | 34 | 35 | 36 | 37 | 38 | 39 |
| | S30 | S31 | S32 | S33 | S34 | S35 | S36 | S37 | S38 | S39 |
| | 40 | 41 | 42 | 43 | 44 | 45 | 46 | 47 | 48 | 49 |
| | S40 | S41 | S42 | S43 | S44 | S45 | S46 | S47 | S48 | S49 |
| | 50 | 51 | 52 | 53 | 54 | 55 | 56 | 57 | 58 | 59 |
| | S50 | S51 | S52 | S53 | S54 | S55 | S56 | S57 | S58 | S59 |
| | 60 | 61 | 62 | 63 | 64 | 65 | 66 | 67 | 68 | 69 |
| | S60 | S61 | S62 | S63 | S64 | S65 | S66 | S67 | S68 | S69 |
| | 70 | 71 | 72 | 73 | 74 | 75 | 76 | 77 | 78 | 79 |
| | S70 | S71 | S72 | S73 | S74 | S75 | S76 | S77 | S78 | S79 |

1 Block (8 x 8)

Fig. 7C

Read for Phase 1
Write for Phase 2

| Anchor Address Segment | | | | | | | | | |
|---|---|---|---|---|---|---|---|---|---|
| 0 S0 | 1 S8 | 2 S16 | 3 S24 | 4 S32 | 5 S40 | 6 S48 | 7 S56 | 8 S64 | 9 S72 |
| 10 S1 | 11 S9 | 12 S17 | 13 S25 | 14 S33 | 15 S41 | 16 S49 | 17 S57 | 18 S65 | 19 S73 |
| 20 S2 | 21 S10 | 22 S18 | 23 S26 | 24 S34 | 25 S42 | 26 S50 | 27 S58 | 28 S66 | 29 S74 |
| 30 S3 | 31 S11 | 32 S19 | 33 S27 | 34 S35 | 35 S43 | 36 S51 | 37 S59 | 38 S67 | 39 S75 |
| 40 S4 | 41 S12 | 42 S20 | 43 S28 | 44 S36 | 45 S44 | 46 S52 | 47 S60 | 48 S68 | 49 S76 |
| 50 S5 | 51 S13 | 52 S21 | 53 S29 | 54 S37 | 55 S45 | 56 S53 | 57 S61 | 58 S69 | 59 S77 |
| 60 S6 | 61 S14 | 62 S22 | 63 S30 | 64 S38 | 65 S46 | 66 S54 | 67 S62 | 68 S70 | 69 S78 |
| 70 S7 | 71 S15 | 72 S23 | 73 S31 | 74 S39 | 75 S47 | 76 S55 | 77 S63 | 78 S71 | 79 S79 |

Fig. 7D

Read for Phase 2
Write for Phase 3

| Anchor Address Segment | | | | | | | | | |
|---|---|---|---|---|---|---|---|---|---|
| 0 S0 | 1 S64 | 2 S49 | 3 S34 | 4 S19 | 5 S4 | 6 S68 | 7 S53 | 8 S38 | 9 S23 |
| 10 S8 | 11 S72 | 12 S57 | 13 S42 | 14 S27 | 15 S12 | 16 S76 | 17 S61 | 18 S46 | 19 S31 |
| 20 S16 | 21 S1 | 22 S65 | 23 S50 | 24 S35 | 25 S20 | 26 S5 | 27 S69 | 28 S54 | 29 S39 |
| 30 S24 | 31 S9 | 32 S73 | 33 S58 | 34 S43 | 35 S28 | 36 S13 | 37 S77 | 38 S62 | 39 S47 |
| 40 S32 | 41 S17 | 42 S2 | 43 S66 | 44 S51 | 45 S36 | 46 S21 | 47 S6 | 48 S70 | 49 S55 |
| 50 S40 | 51 S25 | 52 S10 | 53 S74 | 54 S59 | 55 S44 | 56 S29 | 57 S14 | 58 S78 | 59 S63 |
| 60 S48 | 61 S33 | 62 S18 | 63 S3 | 64 S67 | 65 S52 | 66 S37 | 67 S22 | 68 S7 | 69 S71 |
| 70 S56 | 71 S41 | 72 S26 | 73 S11 | 74 S75 | 75 S60 | 76 S45 | 77 S30 | 78 S15 | 79 S79 |

Fig. 7E

| Anchor Address Segment | Read for Phase 3<br>Write for Phase 4 | | | | | | | | | |
|---|---|---|---|---|---|---|---|---|---|---|
| | 0 S0 | 1 S38 | 2 S36 | 3 S35 | 4 S73 | 5 S32 | 6 S70 | 7 S29 | 8 S67 | 9 S26 |
| | 10 S64 | 11 S23 | 12 S61 | 13 S20 | 14 S58 | 15 S17 | 16 S55 | 17 S14 | 18 S52 | 19 S11 |
| | 20 S49 | 21 S8 | 22 S46 | 23 S5 | 24 S43 | 25 S2 | 26 S40 | 27 S78 | 28 S37 | 29 S75 |
| | 30 S34 | 31 S72 | 32 S31 | 33 S69 | 34 S28 | 35 S66 | 36 S25 | 37 S63 | 38 S22 | 39 S60 |
| | 40 S19 | 41 S57 | 42 S16 | 43 S54 | 44 S13 | 45 S51 | 46 S10 | 47 S48 | 48 S7 | 49 S45 |
| | 50 S4 | 51 S42 | 52 S1 | 53 S39 | 54 S77 | 55 S36 | 56 S74 | 57 S33 | 58 S71 | 59 S30 |
| | 60 S68 | 61 S27 | 62 S65 | 63 S24 | 64 S62 | 65 S21 | 66 S59 | 67 S18 | 68 S56 | 69 S15 |
| | 70 S53 | 71 S12 | 72 S50 | 73 S9 | 74 S47 | 75 S6 | 76 S44 | 77 S3 | 78 S41 | 79 S79 |

IMAGE PROCESSING APPARATUS AND METHOD FOR CONVERTING IMAGE DATA BETWEEN RASTER SCAN ORDER AND BLOCK SCAN ORDER

CROSS-REFERENCE TO RELATED APPLICATION

This application claims the benefit of Korean Patent Application No. 10-2002-0068871, filed Nov. 7, 2002, the disclosure of which is hereby incorporated herein by reference in its entirety.

BACKGROUND OF THE INVENTION

1. Field of the Invention

The present invention relates to an image processing apparatus method for converting image data between a raster scan order and a block scan order.

2. Description of the Related Art

As is known in the image processing art, a joint photographic experts group (JPEG) utilizes a discrete cosine transform (DCT) technique for data compression. The DCT compression technique divides image data into 8*8-pixel unit blocks for data processing. However, an image processor of a camera sequentially outputs image data in a line unit, or raster format (i.e., in a raster scan order: left to right and up to down for a given image). Accordingly, to convert image data from a raster scan order into a block scan order for the DCT compression technique, a line memory is required for storing 8-line image data. The 8*8-pixel unit blocks are thus created in the line memory from the stored 8-line image data. However, since the image processor of the camera outputs new image data, an additional line memory is for the 8-line image data is required for the purposes of sequential processing. In other words, while image data is written into one line memory, image data stored in another line memory is read from the 8*8-pixel unit block. Since image data is comprised of a brightness component Y and chrominance components U and V, two line memories are needed for each Y, U or V component.

FIG. 1 is a schematic block diagram illustrating an image processor of a related art variable graphics array (VGA) standard. FIG. 1 illustrates a line memory system only for the brightness component Y for purposes of brevity. Referring to FIG. 1, a first 8-line brightness component Y is outputted from a camera processor 10 so as to be sequentially stored in a line memory_Y0 20. A second 8-line brightness component Y is sequentially stored in a line memory_Y1 40. At the same time, an 8*8-pixel block unit is read from line memory_Y0 20. At this time, a multiplexer 50 responds to a control signal received from an address generating circuit 30 to transmit the 8*8-pixel unit block read from the line memory_Y0 20 to a JPEG engine 60. Write and read addresses for the line memories 20 and 40 are generated in the address generating circuit 30.

FIG. 2 is a view illustrating a writing operation to output image data from a camera processor 10 in a line memory in a raster scan order. FIG. 3 is a view illustrating a reading operation of stored image data of a line memory in a block scan order. Referring to FIGS. 2 and 3, "H" represents a number of horizontal-direction pixels, also referred to as the "horizontal resolution", and "V" represents a number of vertical-direction pixels, or "vertical resolution". In one line memory, one phase, that is, H*8 pixels are stored. For example, in a phase 0, 0th pixel to H*8−1th pixel are stored in the line memory, and in a phase 1, H*8th pixel to H*8*2−1th pixel are stored in the line memory.

Referring again to FIG. 1, the write addresses for the line memories 20 and 40 are sequentially increased from 0 to H*8−1 (herein, "H" is a horizontal resolution). In an image processor of the VGA standard having the resolution of 640*480 (H=640), the write addresses for the line memories 20 and 40 are sequentially increased from 0 to 640*8−1.

The read addresses (addr) for the line memories for block unit reading are determined according to an algorithm as shown in Equation 1.

$$\text{(Equation 1)}$$
$$\begin{aligned}
&\text{for}(i=0;\ i<H/v;\ i++)\{\\
&\quad\text{for}(vv=0;\ vv<v;\ vv++)\{\\
&\quad\quad\text{for}(hh=0;\ hh<h;\ hh++)\{\\
&\quad\quad\quad addr = vv * H + i * v + hh\\
&\quad\quad\}\\
&\quad\}\\
&\}
\end{aligned}$$

The read address (addr) can be obtained according to an algorithm as shown in Equation 2.

$$\text{(Equation 2)}$$
$$\begin{aligned}
&\text{for}(i=0;\ i<H/v;\ i++)\{\\
&\quad\text{for}(vv=0;\ vv<v;\ vv++)\{\\
&\quad\quad anchor = (vv*H + i)<<3;\\
&\quad\quad\text{for}(hh=0;\ hh<h;\ hh++)\{\\
&\quad\quad\quad addr = anchor + hh\\
&\quad\quad\}\\
&\quad\}\\
&\}
\end{aligned}$$

In Equations (1) and (2), "H" represents a total number of horizontal-direction pixels (H=640 pixels, for example), "v," represents the number of lines included in one block (v=8 lines, for example), "h" represents the number of horizontal-direction pixels included in one block (h=8 pixels, for example), "i" is a variable representing a block sequence, "vv" is a variable representing a vertical-direction pixel (line) index in one block, and "hh" is a variable representing the horizontal-direction pixel index in one block.

In a third phase, when the 8-line brightness component Y is stored in the line memory_Y0 20 with reference to the write address (addr), the block unit reading is performed from the line memory_Y1 40 and the read block is transmitted to the JPEG engine 60 via multiplexer 50.

In this related art image processing method, two line memories are used for each of color components. For example, in case of the VGA standard, two 640*8-byte line memories are used for the brightness component Y. Accordingly, in a case where the memory is desired to be embedded in a chip to reduce power consumption of an image processing system employing the chip, the related art image processing method, in using two memories per component, increases the overall chip size. Moreover, this increase in chip size may be even more limiting (and costly), as the size of an image to be processed is increased.

SUMMARY OF THE INVENTION

An exemplary embodiment of the present invention is directed to an image processing apparatus for converting image data between a raster scan order and a block scan order. The image processing apparatus may include an image data processor for supplying image data of a raster scan order having a given horizontal resolution and a given vertical resolution to a line memory. The line memory may store the image data of a plurality of lines. The image processing apparatus may further include an address generating block for generating a common read/write address for the line memory, and an encoder receiving image data of the block scan order from the line memory.

Another exemplary embodiment of the present invention is directed to an image processing method for converting image data between a raster scan order and a block scan order. In the method, image data of a raster scan order having a given horizontal resolution (H) and given vertical resolution (V) is received, and a common read/write address for a line memory of a plurality of lines (v) may be generated based on the received image data. The received image data of the raster scan order may be stored in a common read/write address of the line memory. Image data of an h*v block scan order may be read out from the common read/write address of the line memory and transmitted to an encoder.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention and wherein:

FIGS. 7B to 7E are views illustrating a sequence of reading/writing segments of FIG. 7A in a line memory according to an exemplary embodiment of the present invention.

DETAILED DESCRIPTION OF THE EXEMPLARY EMBODIMENTS

Figure 1:
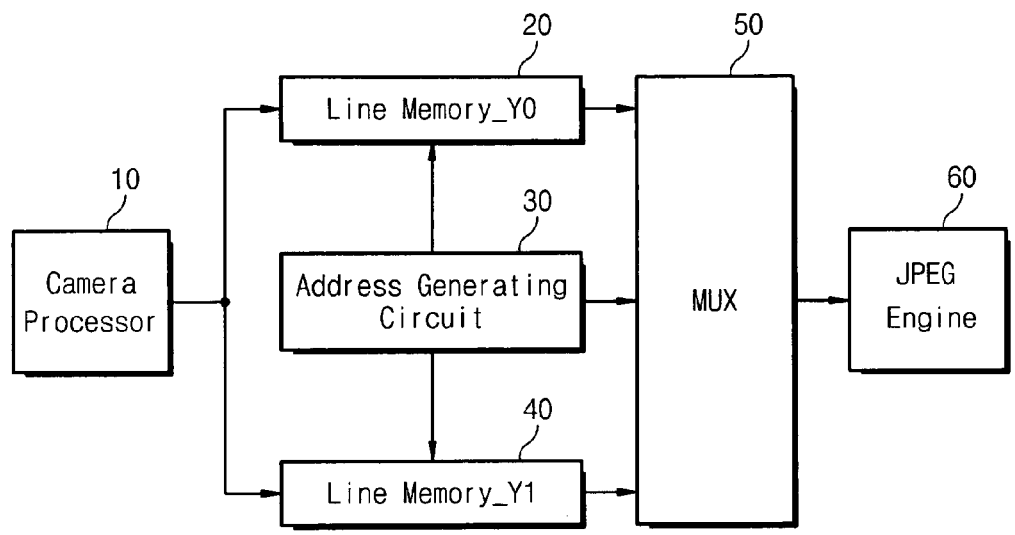
FIG. 1 is a schematic block diagram illustrating an image processor of a related art variable graphics array (VGA) standard.
Figure 2:
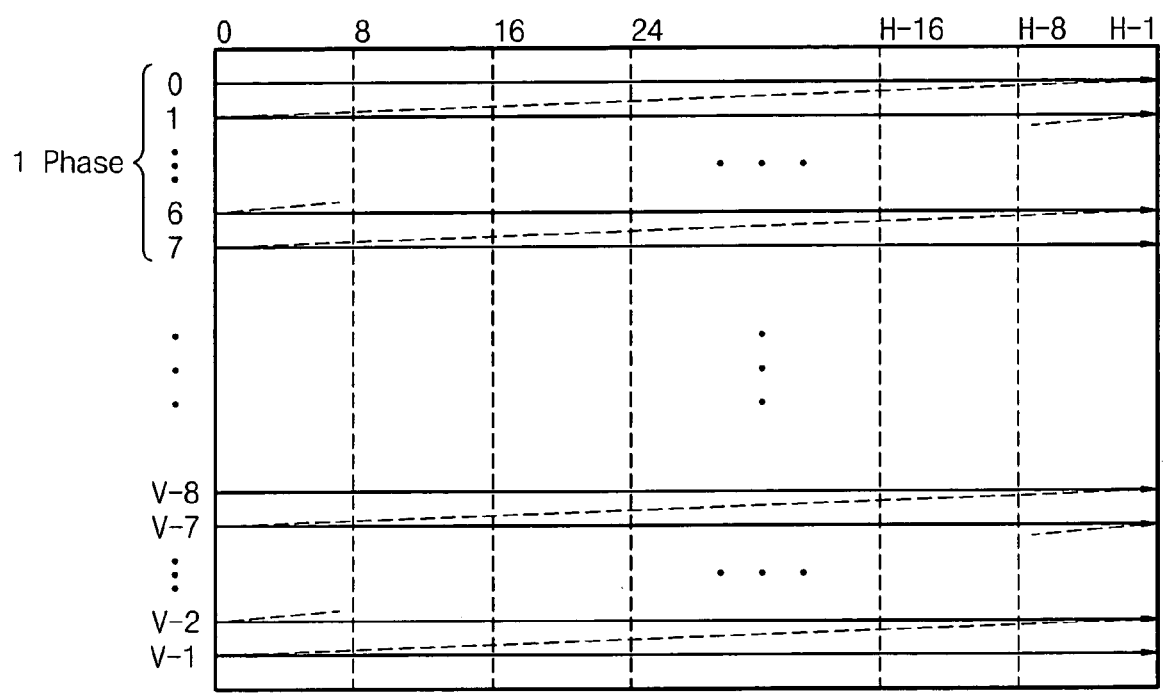
FIG. 2 is a view illustrating a writing operation to output image data from a camera processor in a line memory in a raster scan order.
Figure 3:
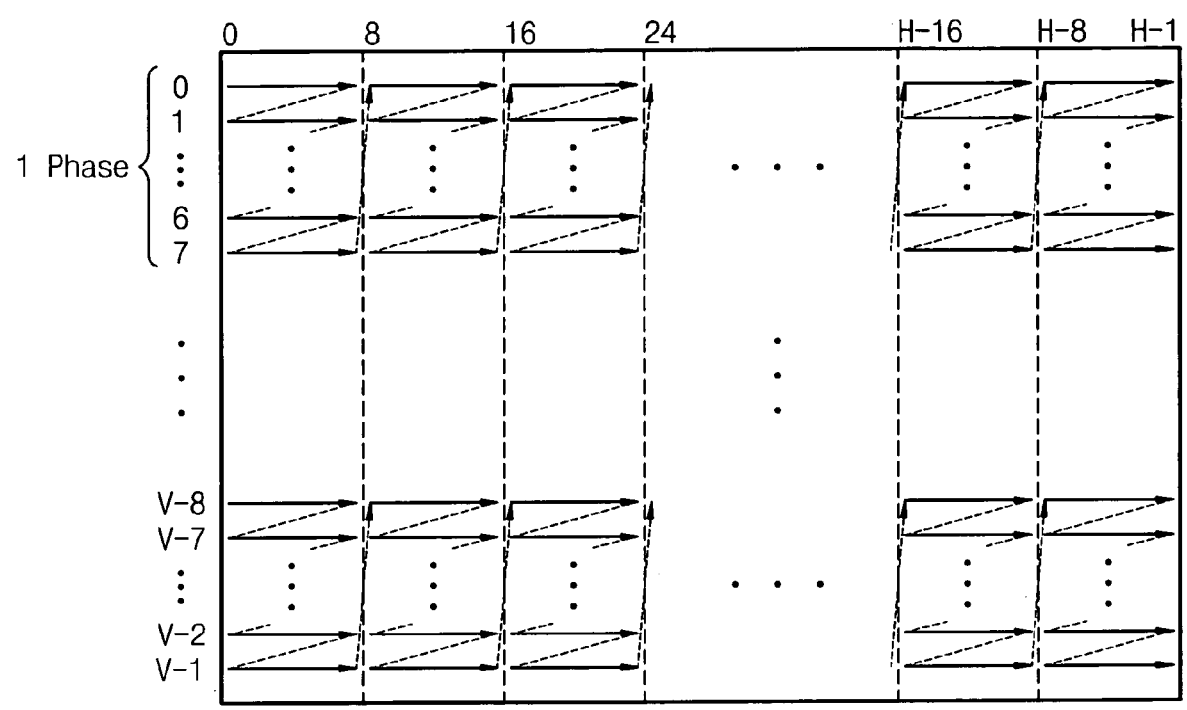
FIG. 3 is a view illustrating a reading operation of stored image data of a line memory in a block scan order.

The exemplary embodiments of the present invention are directed to an image processing apparatus and methods for converting image data between a raster scan order and a block scan order that may substantially reduce line memory size, as well as to an address generator that uses only one line memory for converting image data between a raster scan order and a block scan order.

However, the present invention is not limited to the exemplary embodiments illustrated herein, but merely introduced to provide an easy and complete understanding of the scope and spirit of the present invention.

As will be described in further detail hereafter, an exemplary embodiment of the present invention is directed to an image processing apparatus for converting image data between a raster scan order and a block scan order. The image processing apparatus may include an image data processor for supplying image data of a raster scan order having a given horizontal resolution (H) and a given vertical resolution (V) to a line memory. The line memory may store the image data of a plurality of lines. The image processing apparatus may further include an address generating block for generating a common read/write address for the line memory, and an encoder receiving image data of the block scan order from the line memory. The block may include image data h*v, where h is the number of horizontal-direction pixels of a given block, and where v is the number of horizontal-direction pixels of a given block.

The address generating block may include a block address generator for generating an address of a block to which image data is read from and written into, and a line offset generator for providing a line offset between an earlier common read/write address and a present common read/write address for the line memory. The address generating block may also include an address generator for generating the common read/write address for the line memory based on the block address and line offset.

The block address generator further provides a block offset between a start address of a present block and a start address of a next block for the line memory. The block offset may initially be set to 1. The line offset may initially be set to H/h blocks. The line offset generator further generates a next line offset between a present common read/write address and a next common read/write address for the line memory. The block address and the next line offset may be reset at a start of every phase.

The address generator further generates an anchor address for the line memory based on the block address, and generates a sequential "h" number of the common read/write address from the generated anchor address. After the address generator generates the sequential "h" number of the common read/write address, the address generator increases the anchor address as much as the line offset, and the address generator decreases the anchor address as much as the horizontal resolution (H) minus one (H−1) when the anchor address has increased to equal or exceed (H−1).

After the block address generator generates the common read/write addresses for one block, the block address generator increases the block address as much as the block offset. The block address generator decreases the block address to H−1, when the block address has increased so as to equal or exceed (H−1). The block offset may be set to the line offset at an end of every phase, where a phase may be represented by H/h blocks. The line offset may be set to the next line offset at an end of every phase. Additionally, image data having a horizontal resolution and a vertical resolution may include up to V/v phases.

Figure 4:
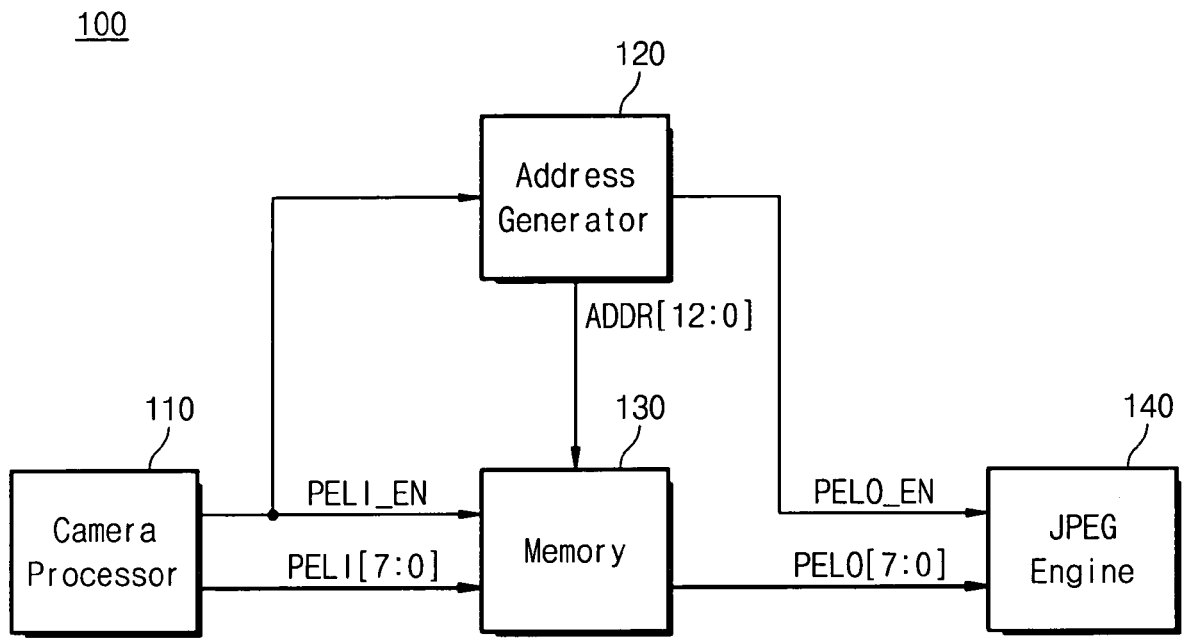
FIG. 4 is a block diagram illustrating an image data processor according to an exemplary embodiment of the present invention.
Figure 5:
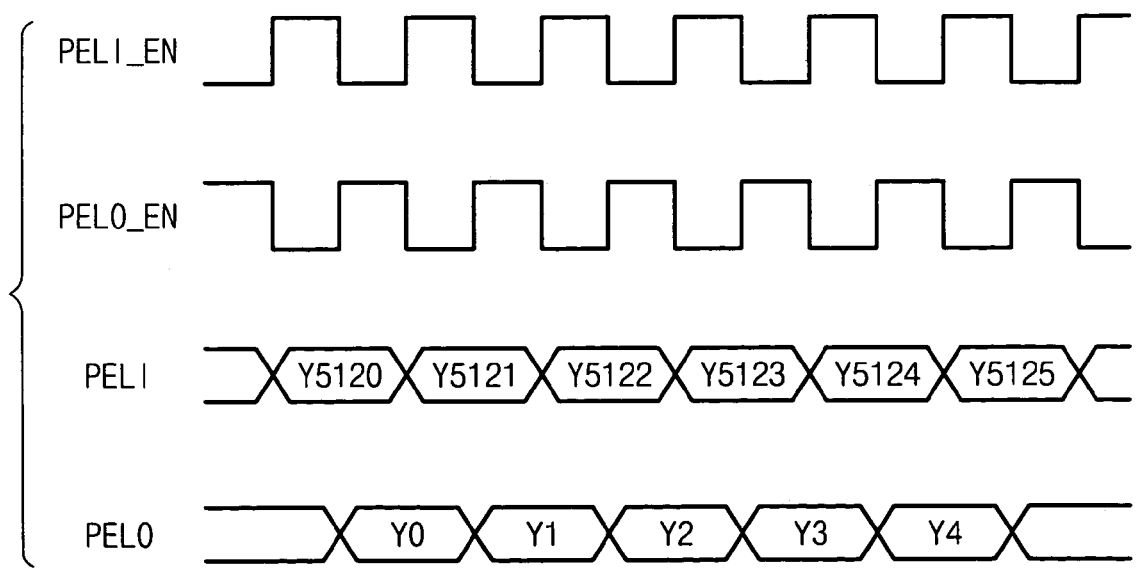
FIG. 5 is a timing diagram depicting operation of the image data processor of FIG. 4 according to an exemplary embodiment of the present invention.

FIG. 4 is a block diagram illustrating an image data processor according to an exemplary embodiment of the present invention. FIG. 5 is a timing diagram depicting operation of the image data processor of FIG. 4 according to an exemplary embodiment of the present invention. Reference for the following discussion thus will be occasionally made to both FIGS. 4 and 5.

Referring to FIG. 4, the image data processor 100 may include a camera processor 110 that outputs image data in a raster scan order. The image data may include a brightness component Y and chrominance components U and V, for example. For reasons of brevity and clarity, FIG. 4 illustrates only a line memory_Y 130 (hereafter 'line memory 130') for the brightness component Y. The camera processor 110 synchronizes to a clock signal so as to output image data such as the brightness component Y. The output brightness component Y may be stored in the line memory 130. If image data to be processed has a resolution of H*V (horizontal resolution times vertical resolution for the image data as a whole) and an encoder 140 (such as a Joint Photographic Experts Group (JPEG) engine 140) processes image data in an h*v block unit (where h is the number of horizontal-direction pixels of a given block and v is the number of horizontal-direction pixels of a given block), the line memory 130 has an H*v-byte capacity. For example, in the case that a JPEG compression technique is used, "h" and "v" may have a value of 8. Hereinafter, an exemplary case in which an image processor or method of image processing uses a JPEG compression technique will be described, in which "h" and "v," have the value of 8 in the VGA standard.

The image data processor 100 may include an address generating circuit 120, (shown as 'address generator 120' in FIG. 4) that generates a common read/write address for the line memory 130. The write address and the read address for the line memory 130 may be identical to each other. In other words, a write operation may be simultaneously performed in a memory cell to which an address is applied for a reading operation. This will be described in further detail with reference to the timing diagram of FIG. 5.

In general, operation of image data processor 100 may thus be described with reference to FIG. 4. As discussed above, the camera processor 110 may provide image data of a raster scan order for processing at a resolution of H*V (horizontal times vertical resolution), for example, that may be written to and stored in line memory 130. Address generating circuit 120 generates a common read/write address for the line memory 130, so that an encoder such as JPEG 140 receives image data of an h*v block scan order (h*v representing the number of horizontal-direction pixels (h) included in one block times the number of vertical-direction pixels (v) included in one block, converted from the raster scan order) that is read from the line memory 130. As will be described in further detail below, this reading operation may thus be simultaneously performed with the writing operation at line memory 130 to store the image data of a next, or sequential, raster scan order that is received from the camera processor 110.

Referring now to FIGS. 4 and 5, if an input enable signal (PELI_EN) from the camera processor 110 is in an active high state, image data stored in the common read/write address (addr) of the line memory 130 is read. When an output enable signal (PELO_EN) signal is in the active high state, the read image data from the line memory 130 is provided to the JPEG engine 140. On the other hand, when the input enable signal (PELI_EN) is in an active low state, image data (PELI [7:0]) from the camera processor 110 is written to the line memory 130, as shown in FIG. 4.

At this time, the address of the line memory 130 into which the image data (PELI [7:0]) is written is a common read/write address (ADDR). The common read/write address (ADDR) is generated from the address generator 120. Accordingly, since the line memory 130 stores the number of pixel data H*8, that is, 640*8=5120 pixels, 0th pixel data to 640*8−1=5119th pixel data may be read from the line memory 130 in a given phase, for example, while the 5120th pixel data to the 4299th pixel data from the camera processor 110 (the next sequential pixel data of a next given phase that is written from camera processor 110 to be stored) are stored in the line memory 130. Thus, a write operation may be simultaneously performed in line memory 130 to which an address is applied for a reading operation.

The common read/write address (ADDR) may be generated according to the following Equation 3 below, which may be programmed using C++ as shown below, for example.

(Equation 3)

```
no_hor_bk = 640 >> 3;
no_size = no_hor_bk << 3 − 1;
block_offset = 1;
line_offset = no_hor_bk;
    while (!finished){
        anchor = 0;
        block_addr = 0;
        next_line_offset = 0;
        for (i=0; i<no_hor_bk; i++){
            anchor = block_addr;
            for (vv=0; vv<8; vv++){
                for (hh=0; hh<8; hh++){
                    addr = anchor << 3 + hh;
                }
                anchor += line_offset;
                anchor −= no_size(if anchor >= no_size);
            }
            block_addr += block_offset;
            block_addr −= no_size (if block_addr >= no_size);
            next_line_offset += line_offset;
            next_line_offset −= no_size(if next_line_offset >= no_size);
        }
        block_offset = line_offset;
        line_offset = next_line_offset;
    }
```

In Equation 3, "addr" may be referred to as the common write/read address (ADDR), "i" is a block index, "hh" is a horizontal-direction index, and "vv" is a vertical-direction index. The term "no_hor_bk" represents the number of blocks included in one phase, and "no_size" represents the number−1 of horizontal-direction pixels. In Equation 3, if a value other than a value of 640 horizontal-direction pixels is used, the common read/write address may be generated based on the size of the image to be processed.

In order to assist explanation as to how Equation 3 may be interpreted to generate a common read/write address, the functions invoked by Equation 3 may include the following in order to generate a common read/write address:

(a) initializing a block offset and a line offset;

(b) initializing a block address and a next line offset;

(c) setting an anchor address to the block address;

(d) generating a sequential "h" number of common read/write addresses from the anchor address, where h represents the number of horizontal-direction pixels included in one block;

(e) increasing the anchor address as much as the line offset;

(f) repeating steps (d)~(e) until the common read/write addresses for h*v blocks are all generated, where v represents the number of lines included in one block;

(g) increasing the block address as much as the block offset;

(h) increasing the next line offset as much as the line offset;

(i) repeating steps (c)~(h) until image data for H/h blocks are all processed;

(j) setting the block offset to the line offset;

(k) setting the line offset to the next line offset; and (l) repeating steps (b)~(k) during the time when image data of the raster scan order is supplied.

In step (e), when the increase in anchor address causes the anchor address to reach the line offset, so that the anchor address equals or exceeds the horizontal resolution (H) minus 1 (H−1), the anchor address may be decreased to equal H−1. Also, in step (h), when the increase in block address causes the block address to reach the block offset, so that the block address equals or exceeds H−1, the block address may be decreased to equal H−1.

Figure 6:
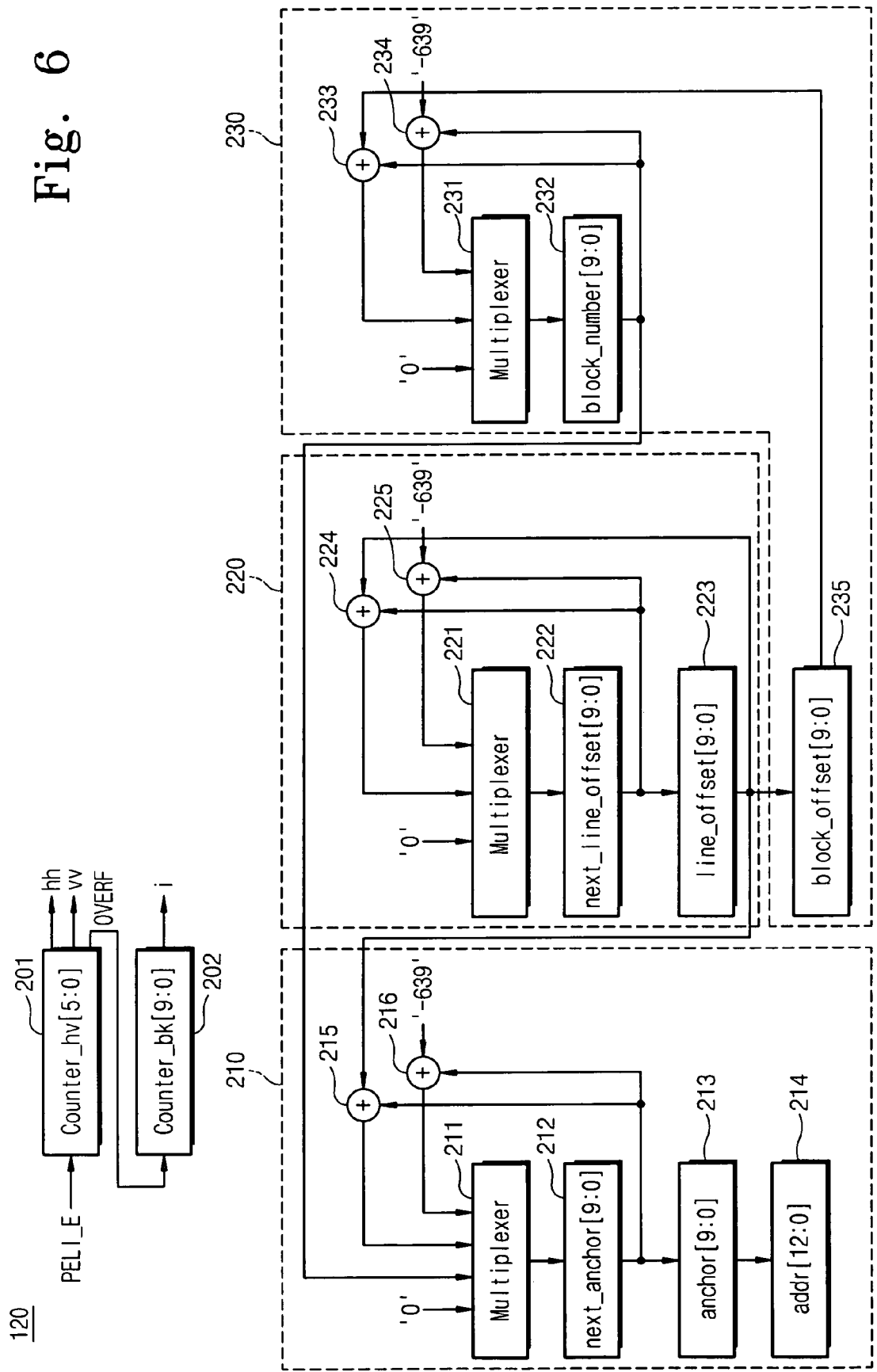
FIG. 6 is a view illustrating an address generating circuit of FIG. 4 according to an exemplary embodiment of the present invention.

FIG. 6 is a view illustrating the address generating circuit of FIG. 4 according to an exemplary embodiment of the present invention. In order to generate the above common read/write address (ADDR), the address generating circuit 120 of the present invention has a construction as shown in FIG. 6.

Referring to FIG. 6, the address generating circuit 120 may include two counters 201 and 202, an address generator 210, a line offset generator 220 and a block address generator 230. Numeral values and size of each of the structural elements may be determined according to the VGA standard, for example, it being understood that the numeral values and size may be set differently in other standards.

Counter 201 may be constructed by a 6-bit counter. A value of the counter 201 may be increased by 1 whenever the input enable signal (PELI_EN) from the camera processor 110 is in an active state. A more significant 3-bit of the counter 201 provides the vertical-direction index (vv), and a less significant 3-bit thereof provides the horizontal-direction index (h). The vertical-direction index (vv) may vary from 0 to 8 so as to designate the lines of the line memory 130, and the horizontal-direction index (hh) may vary from 0 to 8 so as to designate the horizontal-direction pixels.

Counter 202 may be configured as a 10-bit counter, for example. Whenever an overflow signal (OVERF) from the counter 201 is in the active state, a value in counter 202 may be increased by 1. The counter 202 provides a block index (i) varying from 0 to 640 (where block index i=H/h*v=640/8*8), so as to designate the blocks included in one phase.

Referring to FIG. 6, in address generator 210, a sum of a next anchor address (next_anchor [9:0]) of a next anchor address register 212 and a line offset (line_offset [9:0]) stored in a line offset register 223 may be output from an adder 215. In an adder 216, if the next anchor address (next_anchor [9:0]) stored in the next anchor address register 212 is larger than the number of the horizontal-direct pixels 640−1, that is, 639 pixels, the number 639 is subtracted from the next anchor address (next_anchor [9:0]).

In the multiplexer 211, several parameters may be sequentially provided for the next anchor address register 212. For example, a value of 0 (when an initialization signal (init) is in an active state), a block address (block_addr [9:0]) from the block address operator 232 (when the block index (i) from the counter 202 is increased), and outputs from adders 215 and 216 (when the horizontal-direction index (hh) is overflowed (that is, when "hh" equals to a value of 8)) may be sequentially provided for the next anchor address register 212. Although not shown in FIG. 6, the initialization signal (init) may be a signal synchronized and activated every 8 cycles of a horizontal synchronization signal that is received from camera processor 110, for example.

In an anchor address register 213, when the vertical-direction index (vv) is overflowed (that is, when "vv" equals to the value of 8), the next anchor address (next_anchor [9:0]) is received from the next anchor address register 212. At a common write/read address operator 214, the anchor address (anchor [9:0]) stored in the anchor address register 213 is shifted to the left three times. Whenever the horizontal-direction index (hh) is increased, the horizontal-direction index (hh) is added to the shifted anchor address (anchor [9:0]<<3). The address operated in the common write/read address operator 214 thus becomes the common write/read address (ADDR). Accordingly, and referring back to FIG. 4, the line memory 130 outputs image data stored in the common write/read address therefrom, and the JPEG engine 140 responds to the output enable signal (PELO_EN) so as to receive the image data outputted from the line memory 130.

Referring again to FIG. 6, the line offset generator 220 may include an adder 224 that adds a next line offset (next_line offset [9:0]) stored in a next line offset register 222 with a line offset (line_offset [9:0]) stored in a line offset register 223. In an adder 225, if the next line offset (next line offset [9:0]) stored in the next line offset register 222 is larger than the number of the horizontal-direction pixels 640−1, that is, 639, the number 639 is subtracted from the next_line offset [9:0]).

The line offset generator 220 may also include a multiplier 221. In the multiplexer 221, the value of 0 when the initialization signal (init) is in the active state, and outputs of the adders 224 and 225 when the vertical-direction index (vv) is overflowed (that is, when "vv" equals to the value of 8) may be sequentially selected for output to the next line offset register 222. In the line offset register 223, when the block index (i) is overflowed (that is, when "i" equals to a value of 80), the next line offset (next_line_offset [9:0]) stored in the next line offset register 222 is received.

The block address generator 230 may include an adder 233, in which a block address (block_addr [9:0]) stored in a block address register 232 is added with a block offset (block_offset [9:0]) stored in a block offset register 235. In an adder 234, when the block_address (block_addr [9:0]) stored in the block address register 232 is larger than 639, the number 639 is subtracted from the block address (block_addr[9:0]).

The block address generator 230 may also include a multiplier 231. In the multiplexer 231, the value of 0 when the initialization signal (init) is in the active state, and outputs from adders 233 and 234 when the vertical-direction index (vv) is overflowed (that is, when "vv" equals to the value of 8) may be sequentially selected for output to the block address register 232.

Figure 7A:
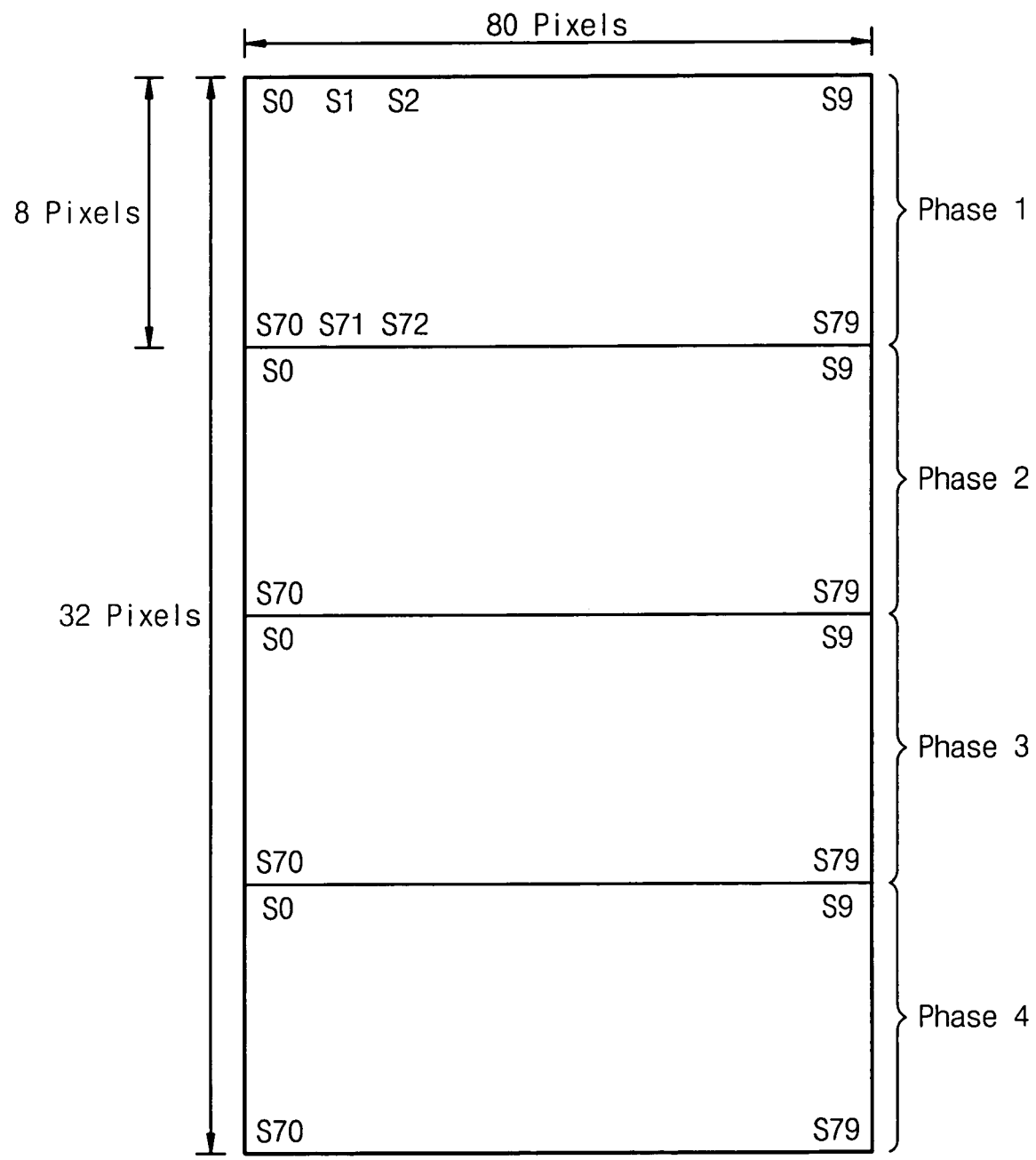
FIG. 7A is a view illustrating image data output from a camera processor according to an exemplary embodiment of the present invention.

FIG. 7A is a view illustrating image data outputted from a camera processor in accordance with an exemplary embodiment of the present invention. FIGS. 6 and 7A may be referred to for illustrating an operation in accordance with the exemplary embodiments of the present invention in greater detail. For reasons of clarity, the line memory in which 80*8-pixel image data can be stored will be described as an exemplary line memory.

In FIG. 7A, the horizontal resolution (H) of the camera processor 110 is a value of 80 and the vertical resolution thereof (V) is a value of 32, hence 80*32. In an image processing system including the line memory 130 (that is of a size of 80*8 for storing 80*8-pixel image data (total of 640 pixels)), since one phase has a size of 80*8 pixels, one picture includes four (4) phases. Each of the phases includes 80 segments. A segment represents a line consisting of the horizontal-direction of 8 pixels that constitute the block. Each of the numerals of the segments (S0-S79) represents a sequence of the image data output from the camera processor 110. An 'anchor address' represents an address of the line memory 130. A value obtained by multiplying eight times the anchor address is coincident with the address of the line memory 130, e.g., the anchor addresses are 0, 1, 2, 3, ... 79.

FIGS. 7B to 7E are views illustrating a sequence of reading/writing segments of FIG. 7A in a line memory according to an exemplary embodiment of the present invention. The exemplary line memory has a size of 80*8 to store 80*8-pixel image data (640 pixels). In the views of FIGS. 7B-7E, an address of an address buffer and the line memory gradually increase, as viewing FIGS. 7B-7E from left to right and from up to down.

The 80*8-pixel image data (Phase 1) output from the camera processor 110 is sequentially written in addresses 0 to 640 of the line memory 130. In other words, 80 segments (S0-S79), each segment containing 8 pixels (80*8=640) are sequentially stored, as shown in FIG. 7B. For example, segment (S0) includes the pixels 0~7, segment (S1) includes pixels 8~15, segment 10 includes pixels 80~87, etc. At this time, anchor addresses 0~79 are generated every 8 pixels, that is, an anchor address is generated and maintained at a constant value for every 8 pixels. The anchor addresses are stored in the anchor address register 213 of FIG. 6. When an initial 8-line image data (80*8 pixels) is sequentially stored in line memory 130, the anchor addresses 0~79 coincide with values obtained by dividing the address having a first pixel of each of the segments stored therein by 8. Accordingly, a value obtained by multiplying 8 times the anchor address is coincident with the address of the line memory 130 having the first pixel of the segment stored therein.

FIG. 7B thus shows a state where the pixels of Phase 1 are written in the line memory. When the pixels are stored in the line memory, the anchor address sequence is 0, 1, 2, 3, ... 79. Thus, segments S0, S10, S20, S30, S40, S50, S60 and S70 (the oblique line segments) are in the first 8×8 block, as shown in FIG. 7B. Segments S1, S11, S21, S31, S41, S51, S61 and S71 are in the second block. In other words, all ten blocks are stored in the line memory.

FIG. 7C shows the state where the pixels of Phase 2 are written in the line memory, after the pixels of Phase 1 that had been stored in the line memory are read out. At this time, the anchor address sequence is 0, 10, 20, ..., 70, 1, 11, 21, ..., 71, ..., 9, 19, 29, ..., 79, when the pixel data is read from and/or written to the line memory. Therefore the segments S0, S1, S2, S3, ... S79 are sequentially written in the line memory according to the anchor address sequence, in order to read the data sequentially on a block-by-block basis, as was shown in FIG. 7B. In FIG. 7C, the oblique line segments are in the first 8×8 block to be read to the block scan unit for Phase 2.

FIG. 7D shows the state where the pixels of Phase 3 are written in the line memory, after the pixels of Phase 2 that had been stored in the line memory are read out. At this time, the anchor address sequence is 0, 21, 42, 63, 5, 26, 47, 68; 10, 31, 52, ..., 78, ..., 11, 32, 53, ..., 79, when the pixel data is read from and/or written to the line memory. In FIG. 7D, the oblique line segments are in the first 8×8 block to be read to the block scan unit for Phase 3.

FIG. 7E shows the state where the pixels of Phase 4 are written in the line memory, after the pixels of Phase 3 that had been stored in the line memory are read out. At this time, the anchor address sequence is 0, 52, 25, 77, ..., 73, 46, 31, 52, ..., 78, ..., 11, 32, 53, ..., 79. In FIG. 7E, the oblique line segments are in the first 8×8 block to be read to the block scan unit for Phase 4. After phase 4 (the last phase) is written in the line memory 130, with reference to the generated common read/write address, only a reading operation from the line memory 130 is performed.

According to the exemplary embodiments of the present invention described above, image data of the first phase outputted from the camera processor 110 is stored in the line memory 130. With reference to the generated common read/write addresses, as shown in FIGS. 7B-7E, image data of a first phase is read from the line memory 130, and then image data of a next (second) phase that is output from the camera processor 110 is stored in the line memory 130. At this time, the common read/write address for the line memory is generated based on the address of the block, an offset of the block and a line offset, including image data to be read such that the conversion of image data from a raster scan order to a block scan order may be efficiently read through a single line memory.

An example of another algorithm of generating the common read/write address (ADDR) is shown in the following Equation 4.

(Equation 4)

```
no_hor_bk = 640 >> 3;
no_size = no_hor_bk << 3 - 1;
block_offset = 1;
line_offset = no_hor_bk;
while (!finished){
    for (i=0; i<no_hor_bk; i++){
        for(vv=0; vv<8; vv++){
            anchor = (block_offset*i + line_offset*v) % no_size;
            if (vv= =7 &&i=no_hor_bk-1) anchor = no_size;
            for (hh=0; hh<8; hh++){
                addr = anchor << 3 + hh;
            }
        }
    }
    block_offset = line_offset;
    line_offset = (line_offset * no_hor_bk) % no_size;
}
```

In Equation (4), "addr" is the common write/read address (ADDR), "i" is the block index, "hh" is a horizontal-direction index, and "vv" is a vertical-direction index. "no_hor_bk" represents the number of the block included in one phase H/h=640/8, and "no_size" represents the number−1 of the horizontal-direction pixel. In Equation 4, if a value other than a value of 640 horizontal-direction pixels is used, the common read/write address may be generated based on the size of the image to be processed. The parameter "%" is a remnant operator, which in C++ is a logical operator that means 'modulo' and has a left associativity.

In order to assist explanation as to how Equation 4 may be interpreted to generate a common read/write address, the functions invoked by Equation 4 may include the following in order to generate a common read/write address. Several of the descriptive functions are similar to those described with respect to Equation 3:

(a) initializing a block offset and a line offset;
(b) generating an anchor address given as a remnant that is obtained by dividing (block offset*i+line offset*vv) by a horizontal resolution H−1, with "i" representing a block sequence of image data of "v" line being sequentially increased from 0 to (H/h)−1, and with "vv" representing a line number of a block that is sequentially increased from 0 to v−1 for "i");

(c) generating a sequential "h" number of common read/write addresses from the anchor address*h;

(d) repeating steps (b)~(c) until the common read/write addresses for h*v blocks are all generated;

(e) repeating steps (b)~(c) until the "i" is sequentially increased from 0 to v−1;

(f) setting the block offset to the line offset;

(g) setting the remnant obtained by dividing (line offset*H/h) by the horizontal resolution H−1, to the line offset; and (h) repeating steps (b)~(g) during the time when image data of the raster scan order is supplied.

In Equations 5 and 6, the same indexes may be used as has been described in Equations 3 and 4. The algorithm of Equation 4 is programmed to use three multipliers, but the algorithm can be modified so as to use a single multiplier, as shown in the following Equation 5.

| (Equation 5) |
|---|
| no_hor_bk = 640 >> 3;<br>no_size = no_hor_bk << 3 − 1;<br>block_offset = 1;<br>line_offset = no_hor_bk;<br>while (!finished){<br>    block_addr = 0;<br>    for (i=0; i<no_hor_bk; i++){<br>        line_addr = 0;<br>        for(vv=0; vv<8; vv++){<br>            anchor = (block_addr + line_addr) % no_size;<br>            if (vv==7 &&i==no_hor_bk−1) anchor = no_size;<br>            for (hh=0; hh<8; hh++){<br>                addr = anchor << 3 + hh;<br>            }<br>            line_addr += line_offset;<br>        }<br>        block_addr += block_offset;<br>    }<br>    block_offset = line_offset;<br>    line_offset = (line_offset * no_hor_bk) % no_size;<br>} |

The functions described by Equation 5 are somewhat similar to Equation 4, but fewer multiplier operations (one versus three) are required. Accordingly, the functions invoked by Equation 5 may include the following in order to generate a common read/write address. Several of the descriptive functions are similar to those described with respect to Equations 3 and/or 4:

(a) initializing a block offset and a line offset;

(b) initializing a block address;

(c) initializing a line address;

(d) generating an anchor address given as the remnant obtained by dividing a sum of the block address and the line address by the horizontal resolution H−1;

(e) generating a sequential "h" number of common read/write addresses from the anchor address*h;

(f) increasing the line address as much as the line offset;

(g) repeating the steps (d)~(f) until the common read/write addresses for h*v blocks are all generated;

(h) increasing the block address as much as the block offset;

(i) repeating the steps (c)~(h) until image data for H/h blocks are all processed;

(j) setting the block offset to the line offset;

(k) setting the remnant obtained by dividing the line offset*H/h by the horizontal resolution H−1, to the line offset; and (l) repeating the steps (b)~(k) during the time when image data of the raster scan order is supplied.

The algorithm of Equation 5 can be modified as in the following equation 6, so as to prevent sizes of the block address (block_addr) and the line address (line_addr) from being increased infinitely, and so as to reduce the remnant operator (%).

| (Equation 6) |
|---|
| no_hor_bk = 640 >> 3;<br>no_size = no_hor_bk << 3 − 1;<br>block_offset = 1;<br>line_offset = no_hor_bk;<br>while (!finished){<br>    block_addr = 0;<br>    for (i=0; i<no_hor_bk; i++){<br>        line_addr = 0;<br>        for (vv=0; vv<8; vv++){<br>            anchor = (block_addr + line_addr);<br>            if (anchor>=no_size) anchor −= no_size;<br>            if (vv==7 &&i==no_hor_bk−1) anchor = no_size;<br>            for (hh=0; hh<8; hh++){<br>                addr = anchor << 3 + hh;<br>            }<br>            line_addr += line_offset;<br>            if (line_addr>=no_size) line_addr −= no-size;<br>        }<br>        block_addr += block_offset;<br>        if (block_addr>=no_size) block_addr −= no_size;<br>    }<br>    block_offset = line_offset;<br>    line_offset = (line_offset * no_hor_bk) % no_size<br>} |

In the algorithm of Equation 6, before the address (addr) is outputted, the algorithm is programmed to calculate the anchor address; however, the algorithm of Equation 6 may be modified as in Equation 3 so as to realize an effective hardware. Therefore, an image processing apparatus, system or method employing the algorithm described by Equation 3 may shorten calculation time, and with a reduced hardware requirement.

In order to assist explanation as to how Equation 6 may be interpreted to generate a common read/write address, the functions invoked by Equation 6 may include the following in order to generate a common read/write address. Several of the descriptive functions are similar to those described with respect to Equations 3-5:

(a) initializing a block offset and a line offset;

(b) initializing a block address;

(c) initializing a line address;

(d) generating an anchor address based on the block address and the line address;

(e) generating a sequential "h" number of common read/write addresses from the anchor address*h;

(f) increasing the line address as much as the line offset;

(g) repeating steps (d)~(f) until the common read/write addresses for h*v blocks are all generated;

(h) increasing the block address as much as the block offset;

(i) repeating steps (c)~(h) until image data for H/h blocks are all processed;

(j) setting the block offset to the line offset;

(k) setting the line offset*H/h to the line offset; and (l) repeating steps (b)~(k) during the time when image data of the raster scan order is supplied.

In step (d), when the generated anchor address is larger than or equal to the horizontal resolution H−1, the anchor address may be decreased to equal the horizontal resolution H−1. In step (f), when the increased line address is larger than or equal to the horizontal resolution H−1, the line address may be decreased to equal the horizontal resolution H−1. In step (h), when the increased block address is larger than or equal to the horizontal resolution H−1, the block address may be decreased to equal the horizontal resolution H−1. In step (k), when the set line offset is larger than or equal to the horizontal resolution H−1, the remnant may be set to the line offset by dividing the line offset by the horizontal resolution H−1.

Thus, the conversion of image data between the raster scan order and the block scan order may be embodied using only a single line memory. Accordingly, the size of the line memory may be reduced by half, in comparison with the line memory requirements of the related art image processors.

On the other hand, in accordance with the exemplary embodiments of present invention, in order to correspond to a given color signal having a plurality of components, the size of the line memory may be modified such that the line memory is adapted to a specific chroma format (for example, 4:2:2, 4:4:4, etc.). For example, in the case of a chroma format of 4:2:2, the size of the line memory is H*2*8, and in case of the format of 4:4:4, the size of the line memory is H*3*8.

As described above, the exemplary embodiments of the present invention use one line memory regardless of the color component being processed, in an effort to thereby reduce the size of the line memory. Accordingly, when the line memory is embedded in a chip, a reduced chip size may be obtained, in an effort to reduce power consumption of an image processing system employing the chip.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. An image processing apparatus for converting image data between a raster scan order and a block scan order, comprising:
   an image data processor for supplying image data of a raster scan order having a given horizontal resolution and a given vertical resolution;
   a line memory for storing image data of a plurality of lines;
   an address generating block for converting supplied image data of raster scan order to block scan order by generating a common read/write address for the line memory so that only one line memory is required for performing simultaneous read and write operations, the address generating block including
      a block address generator for generating an address of a block which image data is read from and written into;
      a line offset generator for providing a line offset between an earlier common read/write address and a present common read/write address for the line memory; and
      an address generator including
         a multiplexer sequentially providing a plurality of input values including at least one output of at least two adders and the address of the block to a next anchor address register;
         a first adder of the at least two adders outputting a sum of a next anchor address of the next anchor address register and the line offset;
         a second adder of the at least two adders outputting a difference of the next anchor address of the next anchor address register and a desired value;
         an anchor address register receiving the next anchor address from the next anchor address register; and
         a common read/write address operator operating upon the received next anchor address to generate the common read/write address; and
   an encoder receiving image data of the block scan order from the line memory and encoding the received image data.

2. The apparatus of claim 1, wherein the encoder is a Joint Photographic Experts Group (JPEG) engine.

3. The apparatus of 1, wherein the block includes image data of horizontal-direction pixels and vertical-direction pixels.

4. The apparatus of claim 1, wherein the block address generator provides a block offset between a start address of a present block and a start address of a next block for the line memory.

5. The apparatus of claim 4, wherein the block offset is initially set to 1.

6. The apparatus of claim 4, wherein the block address generator increases the block address as much as the block offset after the block address generator generates the common read/write addresses for a block.

7. The apparatus of claim 4, wherein the block offset is set to the line offset at an end of every phase.

8. The apparatus of claim 7, wherein image data having the given horizontal resolution (H) and the vertical resolution (V) comprises V/v phases, wherein v represents a number of vertical-direction pixels in a given block.

9. The apparatus of claim 1, wherein the line offset is initially set to a value defined by the given horizontal resolution divided by a number of horizontal-direction pixels in a given block.

10. The apparatus of claim 1, wherein the line offset generator generates a next line offset between a present common read/write address and a next common read/write address for the line memory.

11. The apparatus of claim 10, wherein the block address and the next line offset are respectively reset at a start of every phase.

12. The apparatus of claim 10, wherein the line offset is set to the next line offset at an end of every phase.

13. The apparatus of claim 12, wherein a phase comprises a number of blocks equal to the given horizontal resolution divided by a number of horizontal-direction pixels in a given block.

14. The apparatus of claim 1, wherein the address generator generates an anchor address for the line memory based on the block address, and generates a sequential number of the common read/write address from the generated anchor address.

15. The apparatus of claim 14, wherein the address generator increases the anchor address to equal the line offset after the address generator generates the sequential number of the common read/write address.

16. The apparatus of claim 14, wherein the address generator decreases the anchor address to the given horizontal resolution minus one (H−1) when the anchor address has increased so as to equal or exceed (H−1).

17. The apparatus of claim 1, wherein the block address generator decreases the block address to the given horizontal resolution minus one (H−1) when the block address has increased so as to equal or exceed (H−1).

18. A method for converting image data between a raster scan order and a block scan order, comprising
receiving image data of a raster scan order having a given horizontal resolution and a given vertical resolution;
generating a common read/write address for a line memory of a plurality of lines for performing simultaneous read and write operations using an address generator having
a multiplexer sequentially providing a plurality of input values including at least one output of at least two adders and an address of a block to a next anchor address register;
a first adder of the at least two adders outputting a sum of a next anchor address of the next anchor address register and a line offset;
a second adder of the at least two adders outputting a difference of the next anchor address of the next anchor address register and a desired value;
an anchor address register receiving the next anchor address from the next anchor address register; and
a common read/write address operator operating upon the received next anchor address to generate the common read/write address;
reading image data of a block scan order from the common read/write address of the line memory;
storing image data of the raster scan order in the common read/write address of the line memory;
converting stored image data of raster scan order to the block scan order; and
transmitting image data of the block scan order to an encoder, the encoder encoding the received image data.

19. The method of claim 18 wherein generating the common read/write address further comprises:
(a) initializing a block offset and a line offset;
(b) initializing a block address and a next line offset;
(c) setting an anchor address to the block address;
(d) generating a sequential number of common read/write addresses from the anchor address;
(e) increasing the anchor address as much as the line offset;
(f) repeating (d)~(e) until the common read/write addresses for all blocks are generated;
(g) increasing the block address as much as the block offset;
(h) increasing the next line offset as much as the line offset;
(i) repeating (c)~(h) until image data for a number of blocks equal to the given horizontal resolution divided by a number of horizontal-direction pixels in a given block are processed;
(j) setting the block offset to the line offset;
(k) setting the line offset to the next line offset;
(l) repeating (b)~(k) during a time when image data of the raster scan order is supplied.

20. The method of claim 19, wherein (e) includes reducing the anchor address so as to equal the horizontal resolution, when the anchor address increase equals or exceeds the horizontal resolution.

21. The method of claim 19, wherein (h) includes reducing the block address so as to equal the horizontal resolution, when the block address increase equals or exceeds the horizontal resolution.

22. An image processing apparatus for converting image data between a raster scan order and a block scan order in accordance with the method of claim 19.

23. The method of claim 18 wherein generating the common read/write address further comprises:

(a) initializing a block offset and a line offset;
(b) generating an anchor address as a function of the block offset, line offset and horizontal resolution;
(c) generating a sequential number of common read/write addresses as a function of the anchor address and a number of horizontal-direction pixels in a given block;
(d) repeating (b)~(c) until the common read/write addresses for all blocks are generated;
(e) repeating (b)~(c) until a block sequence of image data (i) for the plurality of lines (v) has sequentially increased from 0 to v−1;
(f) setting the block offset to the line offset;
(g) setting a remnant obtained as a function of the line offset and horizontal resolution to the line offset; and
(h) repeating (b)~(g) during a time when image data of the raster scan order is supplied.

24. An image processing apparatus for converting image data between a raster scan order and a block scan order in accordance with the method of claim 23.

25. The method of claim 18 wherein generating the common read/write address further comprises:
(a) initializing a block offset and a line offset;
(b) initializing a block address;
(c) initializing a line address;
(d) generating an anchor address as a function of the block address, line address and horizontal resolution;
(e) generating a sequential number of common read/write addresses as a function of the anchor address and a number of horizontal-direction pixels in a given block;
(f) increasing the line address as much as the line offset;
(g) repeating (d)~(f) until the common read/write addresses for all blocks are generated;
(h) increasing the block address as much as the block offset;
(i) repeating (c)~(h) until image data for a number of blocks equal to the horizontal resolution divided by the number of horizontal-direction pixels in a given block are processed;
(j) setting the block offset to the line offset;
(k) setting a remnant obtained as a function of the line offset, horizontal resolution and number of horizontal-direction pixels in a given block to the line offset; and
(l) repeating (b)~(k) during a time when image data of the raster scan order is supplied.

26. An image processing apparatus for converting image data between a raster scan order and a block scan order in accordance with the method of claim 25.

27. The method of claim 18 wherein generating the common read/write address further comprises:
(a) initializing a block offset and a line offset;
(b) initializing a block address;
(c) initializing a line address;
(d) generating an anchor address based on the block address and the line address;
(e) generating a sequential number of common read/write addresses as a function of the anchor address and a number of horizontal-direction pixels in a given block;
(f) increasing the line address as much as the line offset;
(g) repeating (d)~(f) until the common read/write addresses for all blocks are generated;
(h) increasing the block address as much as the block offset;
(i) repeating (c)~(h) until image data for a number of blocks equal to the horizontal resolution divided by the number of horizontal-direction pixels in a given block (H/h) are processed;
(j) setting the block offset to the line offset;

(k) setting the line offset * H/h to the line offset; and
(l) repeating (b)~(k) during the time when image data of the raster scan order is supplied.

28. The method of claim 27, wherein (d) includes reducing the anchor address so as to substantially equal the horizontal resolution, when the anchor address increase equals or exceeds the horizontal resolution.

29. The method of claim 27, wherein (f) includes reducing the line address so as to be substantially equal the horizontal resolution, when the line address increase equals or exceeds the horizontal resolution.

30. The method of claim 27, wherein (h) includes reducing the block address so as to be substantially equal to the horizontal resolution, when the block address increase equals or exceeds the horizontal resolution.

31. The method of claim 27, wherein (k) includes setting the remnant to the line offset, when the set line offset equals or exceeds the horizontal resolution.

32. An image processing apparatus for converting image data between a raster scan order and a block scan order in accordance with the method of claim 27.

33. The method of claim 18 wherein generating the common read/write address further comprises:
(a) initializing a block offset and a line offset;
(b) initializing a block address;
(c) setting an anchor address to the block address;
(d) generating a sequential number of common read/write addresses as a function of the anchor address and a number of horizontal-direction pixels in a given block;
(e) increasing the anchor address as much as the line offset;
(f) repeating (d)~(e) until the common read/write addresses for h*v blocks are all generated;
(g) increasing the block address as much as the block offset;
(h) repeating (c)~(g) until image data for a number of blocks equal to the horizontal resolution divided by the number of horizontal-direction pixels in a given block (H/h) are processed;
(i) setting the block offset to the line offset;
(j) setting a remnant obtained as a function of the line offset, H/h and horizontal resolution to the line offset; and
(k) repeating (b)~(j) during a time when image data of the raster scan order is supplied.

34. The method of claim 33, wherein (e) includes reducing the anchor address so as to substantially equal the horizontal resolution, when the anchor address increase equals or exceeds the horizontal resolution.

35. The method of claim 33, wherein (g) further includes reducing the block address so as to be substantially equal to the horizontal resolution, when the block address increase equals or exceeds the horizontal resolution.

36. An image processing apparatus for converting image data between a raster scan order and a block scan order in accordance with the method of claim 33.

37. The method of claim 18, wherein generating the common read/write address is based in part on generating an anchor address, the anchor address representing a segment of pixels of image data that is read from and written to the line memory.

38. The method of claim 37, wherein the anchor address is generated based on at least one of a block address of a block, of the block scan order, in which image data is read from and written to in the line memory, and a block offset between a start address of a present block and a start address of a next block for the line memory.

39. The method of claim 38, wherein the anchor address is set based only on the block address.

40. The method of claim 39, wherein generating a common read/write address further comprises:
(a) initializing the block offset and a line offset;
(b) initializing the block address and a next line offset;
(c) setting the anchor address to the block address;
(d) generating a sequential number of common read/write addresses from the anchor address;
(e) increasing the anchor address as much as the line offset;
(f) repeating (d)~(e) until the common read/write addresses for all blocks are generated;
(g) increasing the block address as much as the block offset;
(h) increasing the next line offset as much as the line offset;
(i) repeating (c)~(h) until image data for a number of blocks equal to the given horizontal resolution divided by a number of horizontal-direction pixels in a given block are processed;
(j) setting the block offset to the line offset;
(k) setting the line offset to the next line offset;
(l) repeating (b)~(k) during a time when image data of the raster scan order is supplied.

41. The method of claim 39, wherein generating a common read/write address further comprises:
(a) initializing the block offset and a line offset;
(b) initializing the block address;
(c) setting the anchor address to the block address;
(d) generating a sequential number of common read/write addresses as a function of the anchor address and a number of horizontal-direction pixels in a given block;
(e) increasing the anchor address as much as the line offset;
(f) repeating (d)~(e) until the common read/write addresses for h*v blocks are all generated;
(g) increasing the block address as much as the block offset;
(h) repeating (c)~(g) until image data for a number of blocks equal to the horizontal resolution divided by the number of horizontal-direction pixels in a given block (H/h) are processed;
(i) setting the block offset to the line offset;
(j) setting a remnant obtained as a function of the line offset, H/h and horizontal resolution to the line offset; and
(k) repeating (b)~(j) during a time when image data of the raster scan order is supplied.

42. The method of claim 38, wherein the anchor address is generated based on the block offset, a line offset between an earlier common read/write address and a present common read/write address for the line memory, and the horizontal resolution.

43. The method of claim 42, wherein generating a common read/write address further comprises:
(a) initializing the block offset and the line offset;
(b) generating the anchor address as a function of the block offset, line offset and horizontal resolution;
(c) generating a sequential number of common read/write addresses as a function of the anchor address and a number of horizontal-direction pixels in a given block;
(d) repeating (b)~(c) until the common read/write addresses for all blocks are generated;
(e) repeating (b)~(c) until a block sequence of image data (i) for the plurality of lines (v) has sequentially increased from 0 to v−1;
(f) setting the block offset to the line offset;
(g) setting a remnant obtained as a function of the line offset and horizontal resolution to the line offset; and (h) repeating (b)~(g) during a time when image data of the raster scan order is supplied.

44. The method of claim 38, wherein the anchor address is generated based on at least the block address and a line address.

45. The method of claim 44, wherein generating a common read/write address further comprises:
- (a) initializing the block offset and a line offset;
- (b) initializing the block address;
- (c) initializing the line address;
- (d) generating the anchor address as a function of the block address, line address and horizontal resolution;
- (e) generating a sequential number of common read/write addresses as a function of the anchor address and a number of horizontal-direction pixels in a given block;
- (f) increasing the line address as much as the line offset;
- (g) repeating (d)~(f) until the common read/write addresses for all blocks are generated;
- (h) increasing the block address as much as the block offset;
- (i) repeating (c)~(h) until image data for a number of blocks equal to the horizontal resolution divided by the number of horizontal-direction pixels in a given block are processed;
- (j) setting the block offset to the line offset;
- (k) setting a remnant obtained as a function of the line offset, horizontal resolution and number of horizontal-direction pixels in a given block to the line offset; and
- (l) repeating (b)~(k) during a time when image data of the raster scan order is supplied.

46. The method of claim 44, wherein generating a common read/write address further comprises:
- (a) initializing the block offset and a line offset;
- (b) initializing the block address;
- (c) initializing the line address;
- (d) generating the anchor address based on the block address and the line address;
- (e) generating a sequential number of common read/write addresses as a function of the anchor address and a number of horizontal-direction pixels in a given block;
- (f) increasing the line address as much as the line offset;
- (g) repeating (d)~(f) until the common read/write addresses for all blocks are generated;
- (h) increasing the block address as much as the block offset;
- (i) repeating (c)~(h) until image data for a number of blocks equal to the horizontal resolution divided by the number of horizontal-direction pixels in a given block (H/h) are processed;
- (j) setting the block offset to the line offset;
- (k) setting the line offset * H/h to the line offset; and
- (l) repeating (b)~(k) during the time when image data of the raster scan order is supplied.

47. An image processing apparatus for converting image data between a raster scan order and a block scan order in accordance with the method of claim 18.

* * * * *